Figure 1:
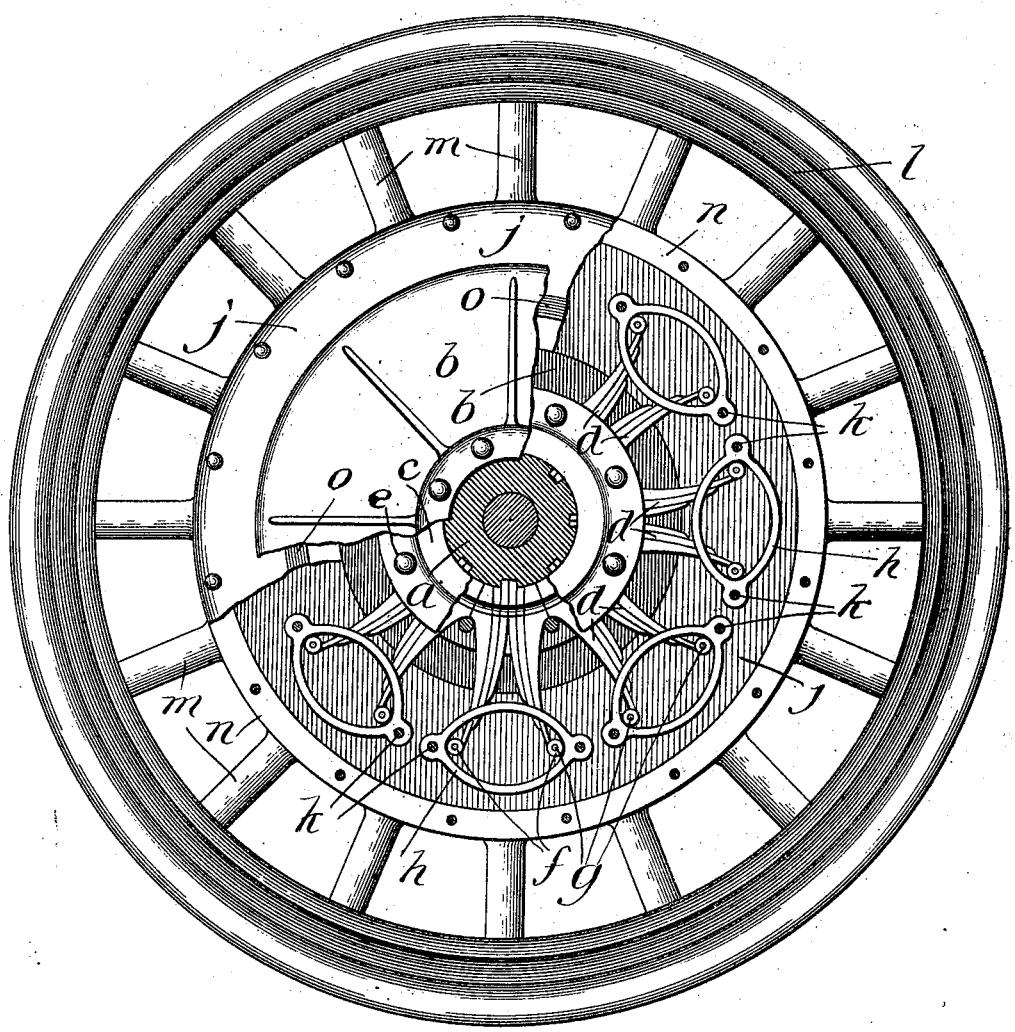

J. F. MITCHELL.
CUSHION WHEEL FOR VEHICLES.
APPLICATION FILED JULY 9, 1906.

1,014,244.

Patented Jan. 9, 1912.
2 SHEETS—SHEET 1.

Witnesses:
Inventor:
John F. Mitchell,
By Thomas F. Sheridan,
Atty.

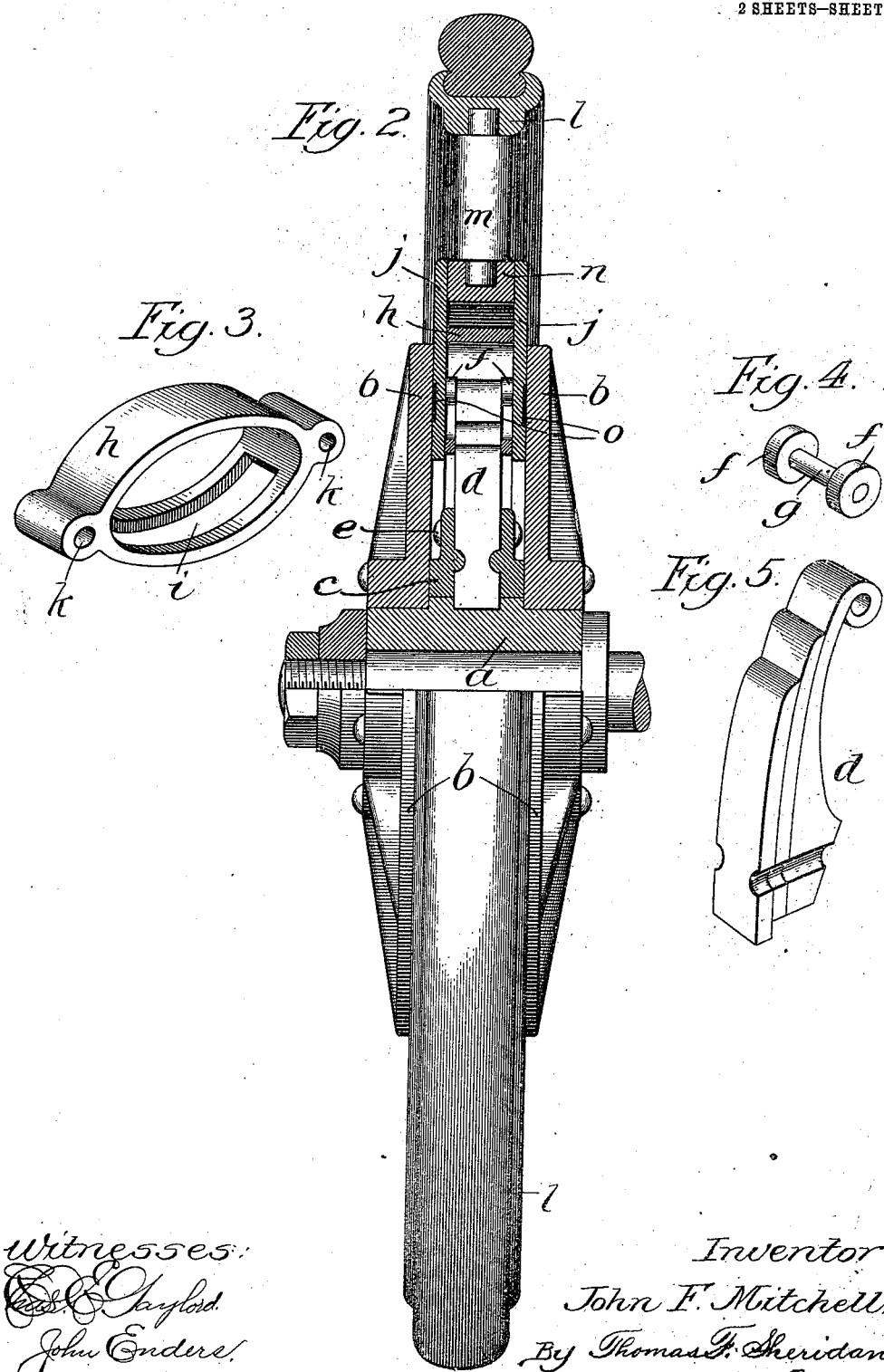

UNITED STATES PATENT OFFICE.

JOHN F. MITCHELL, OF TOPEKA, KANSAS.

CUSHION-WHEEL FOR VEHICLES.

1,014,244.          Specification of Letters Patent.     Patented Jan. 9, 1912.

Application filed July 9, 1906. Serial No. 325,331.

*To all whom it may concern:*

Be it known that I, JOHN F. MITCHELL, a citizen of the United States, residing at Topeka, in the county of Shawnee and State of Kansas, have invented certain new and useful Improvements in Cushion-Wheels for Vehicles, of which the following is a specification.

My invention relates to spring or cushion wheels for automobiles, or other vehicles, in which it is desirable to confine the jar to the rim portion of the wheel and protect the axle from the vibration, which naturally follows the rigid construction of the wheel.
It is the object of this invention to provide cushion wheels which are not unsightly and which have the necessary strength and simplicity of construction to make them of commercial value.
In my improvements I provide a tired exterior rim connected by spokes to an interior rim, the latter being flexibly connected with the hub and thereby with the shaft or axle by means of springs.
My invention is illustrated in the accompanying drawings, forming part of this specification, in which—

Figure 1 is a plan of the wheel—portions thereof being shown in section. Fig. 2 shows a transverse section of the upper half and an elevation of the lower half of the wheel. Fig. 3 is a perspective view of one of the cam tracks detached from the wheel. Fig. 4 a perspective view of the rollers for the tracks, detached from the wheel; and Fig. 5 a perspective view of one of the leaf springs.

I have provided, in combination with the usual hub $a$, a pair of casings $b$ adapted to fit on to a portion of the hub and between which are secured the rings $c$ adapted to clamp upon the edges of a plurality of sets of leaf springs $d$. These rings $c$ are, preferably, made with semicircular lugs upon their inner faces to register with grooves in the springs $d$ and are secured together by the rivets $e$ which bind the plates upon the springs in such a manner as to rigidly fasten them in the positions shown.
Upon the outer or relatively movable ends of the springs $d$ are secured the rollers $f$, preferably pivoted upon the spindles $g$. These rollers are adapted to bear upon the inner face of an elliptical track $h$, having a gap or slot $i$ therein, on the side facing the hub, through which the springs $d$ extend, the rollers $f$ being so mounted that they will bear upon the inner face of the elliptical track beyond the sides of the gap $i$. This elliptical track is, preferably, secured to the casings $j$ by bolts at $k$.

The outer portion of the wheel may be of any desired construction, but is here shown with a rubber tire upon a rim $l$, the latter being attached to the above mentioned casings $j$ through the spokes $m$ and the intermediate rim $n$. In order to completely inclose the moving parts of the wheel, the casing $b$ is made to fit closely outside the casing $j$, the latter being provided with a groove $o$, which may be filled with any desired packing, such as felt, to prevent dust from entering the working parts of the wheel.

In the operation of this device, when the wheel is suddenly forced upward by striking a raised portion in the roadway, the rollers $f$ upon the lower side of the wheel roll upon the inner face of the elliptical track, which is farthest away from the hub, while the rollers upon the upper side of the wheel roll upon the inner face of the elliptical track which is nearest the hub. It will be seen that in so doing both the upper and lower springs, which are normally under considerable moment, are further deflected and each receives part of the strain, while the springs upon the sides, or those which stand at that time substantially horizontal, will be deflected without the rollers changing their positions upon the track.

Another advantage arising from the use of my invention, and which is particularly evident in connection with the drive wheels of automobiles, is that the usual forward lurch of the body of the automobile, occurring when the power is thrown into engagement with the axle, is largely absorbed in the wheel springs, giving the car body a more gradual acceleration.

It will be observed that the springs interposed between and connecting the hub and rim of a wheel embodying my invention will all be flexed longitudinally by any relative movement between the hub and rim. By the term "longitudinally" as above used and as employed in the claims, I mean in the direction of the plane of rotation of the wheel, as distinguished from a movement in the direction of the axis of rotation of the wheel.

While my improvements are here described in connection with a specific form of vehicle wheel, I do not wish to so limit the scope of my invention, many features of which are applicable to other forms of wheels.

I claim:

1. In a vehicle wheel, the combination with a hub, of a rim surrounding the hub, endless cam tracks secured to the rim, and springs connected at their inner ends to the hub and extending at their outer ends within and movably engaging said endless cams, whereby said springs are flexed longitudinally by a relative movement of the hub and rim.

2. In a vehicle wheel, the combination with a hub, of a rim surrounding the hub, elliptical cam tracks secured to the rim, and springs secured to the hub at their inner ends and extending at their outer ends within said cam tracks, whereby said springs are flexed longitudinally through engagement with said tracks by a relative movement of the hub and rim.

3. In a vehicle wheel, the combination with a hub, of a rim surrounding the hub, elliptical cam tracks secured to the rim, a series of pairs of diverging leaf springs interposed between the hub and rim, and means for connecting said pairs of springs to the hub and rim, whereby the springs in each pair are longitudinally flexed toward each other by a relative movement of the hub and rim.

4. In a vehicle wheel, the combination with a hub, of a rim surrounding the hub, a plurality of pairs of diverging leaf springs secured to said hub, elliptical cam guides secured to said rim, and rollers secured to the outer ends of the springs in each pair and engaging within one of said elliptical guides, whereby each pair of springs will be deflected toward each other by a movement of the hub relatively to the rim.

JOHN F. MITCHELL.

Witnesses:
THOMAS F. SHERIDAN,
W. T. JONES.

---

Copies of this patent may be obtained for five cents each, by addressing the "Commissioner of Patents, Washington, D. C."